Patented July 30, 1940

2,209,940

UNITED STATES PATENT OFFICE 2,209,940

METHOD FOR SELF-LACQUERING THERMOPLASTIC MATERIALS

Carleton N. Smith, Rocky River, Ohio, assignor to Carbide and Carbon Chemicals Corporation, a corporation of New York No Drawing. Application March 18, 1938, Serial No. 196,580

13 Claims. (Cl. 260—86)

This invention is a process for producing a glossy surface upon thermoplastic materials by the action of a solvent therefor without injuring the quality of the articles.

A finished article made of a thermoplastic resin may be given a high gloss by subjecting it for a brief period of time to the action of a solvent for the resin. This process, often referred to as self-lacquering, consists simply in dissolving some of the surface resin and reforming a very smooth layer of it as the solvent evaporates. The best results are obtained by the use of a very volatile solvent or mixture of solvents, because rapid evaporation from the surface of the article causes little or no streaking due to liquid drainage as the article is removed from the solvent.

However, this process nearly always brings about a marked deterioration of the article. Almost invariably, extensive surface crazing and marked embrittlement take place after the self-lacquered article has been allowed to stand for some time, and this is particularly evident where the article has been cast or molded, or fabricated in other ways which may create internal stresses. Some thermoplastic resins are more susceptible to such deterioration than others, and the vinyl resins, especially the vinyl ester resins, are particularly difficult to polish or self-lacquer without seriously damaging the articles treated.

This invention provides a method whereby thermoplastic materials may be given a high gloss by treatment with a solvent therefor without causing subsequent embrittlement, surface crazing, or other deterioration of the article due to contact with the solvent.

The essence of the invention lies in preconditioning the material to be self-lacquered in such a manner that the rate of penetration of the solvent into the article is inhibited without materially hindering the solvent from readily dissolving or softening the extreme surface of the material. This may be accomplished by contacting the article with, or immersing it in, a conditioning liquid prior to its contact with the solvent in the self-lacquering operation. The conditioning liquid consists of a mixture of a non-solvent for the material, which has no deleterious effect (such as appreciable swelling or softening) upon the surface of the material when in contact therewith alone, in admixture with a solvent for the material, the components of the mixture being so selected and proportioned that not only the surface of the material will not be appreciably dissolved in the mixture, but the material itself will absorb (or be penetrated by) both the solvent and non-solvent, the latter being absorbed in substantial quantities along with the former. On removing the article from the conditioning bath, it may be air-dried or wiped and immersed in a solvent, where it is left for a predetermined period depending on the solvent used. On removal from the solvent, the article will have a glossy surface which will not subsequently distort or craze, and the toughness or strength of the article remains unchanged even long after the self-lacquering treatment.

Although this process is applicable to the self-lacquering of any thermoplastic material, it is primarily directed to the treatment of vinyl ester resins, and those to which this invention is particularly applicable are resins formed by the conjoint polymerization of a vinyl halide with a vinyl ester of a lower aliphatic acid. Articles of vinyl resins made by the conjoint polymerization of vinyl chloride with vinyl acetate, containing between 70% and 95% vinyl chloride by weight in the polymer and having average molecular weights of approximately 10,000 to 15,000 are particularly suitable for self-lacquering by the process of this invention. (Molecular weights referred to herein are calculated by means of Staudinger's formula from viscosity determinations on solutions of the resins.)

The following examples are given by way of illustration:

Example 1

In this example the articles lacquered were rods approximately 6 inches long, 0.5 inch wide and 0.2 inch thick, molded from a resin made by the conjoint polymerization of vinyl chloride with vinyl acetate and containing about 87% vinyl chloride. As prepared, this resin consisted of a mixture of polymers whose molecular weights varied from 1,000 to 19,000 with a large proportion falling within the range of 6,000 to 15,000. The rods were allowed to stand for various lengths of time in the conditioning solutions, after which time they were removed and either wiped or air-dried for several seconds, and then placed in the solvent for ten seconds. They were then allowed to dry at room temperature. After aging for six months, these rods were subjected to Izod impact tests.

The Izod impact values are expressed as degrees of arc through which the pendulum swings after it has broken the notched test piece. Thus, with a free swing of 88° starting from a 90° angle, an impact value of 82° would show that the test piece was very brittle, while a lower value would indicate a tougher article (that is, more energy was used up in breaking the test piece).

The effects of various treatments are shown in the following table:

| Conditioning dip solution, percent by volume | Time of immersion | Izod impact after 6 months aging |
|---|---|---|
| | Minutes | Degrees |
| None | | 81.9 |
| 20% ethylene dichloride, 80% naphtha | 30 | 63.6 |
| 30% ethylene dichloride, 70% naphtha | 10 | 64.5 |
| 50% ethylene dichloride, 50% isopropyl ether | 7 | 63.0 |
| Carbon disulfide | 2.5 | 82.3 |
| Do | 15 | 82.3 |
| Ethyl ether | 25 | 83.0 |
| Control—no treatment—no self-lacquering | | 67.8 |

These tests demonstrated that the rods which had been treated with mixtures of ethylene dichloride and naphtha, and ethylene dichloride and isopropyl ether, prior to the self-lacquering treatment showed no evidence of embrittlement, and visual inspection disclosed no surface crazing. However, preliminary treatments with such penetrants as carbon disulfide or ethyl ether (or mixtures of the solvent acetone with the non-solvents, water, methanol, ethanol, or isopropanol-water azeotropic mixture) did not prevent these defects. This may be explained from the fact that the resin absorbs the solvent and non-solvent in a definite ratio, depending upon what liquids are used, but substantially independent of the proportions employed in the mixture. For example, almost pure acetone is absorbed when rods of the molded resin are immersed in mixtures of acetone and water ranging from 60% to 90% acetone by volume. On the other hand, the resin absorbs a mixture of about 87% ethylene dichloride and 13% methanol from mixtures of the two in various proportions, while ethylene dichloride and isopropyl ether are absorbed in the volume ratio of about 60 to 40. This indicates that the penetration of pure solvent (acetone from acetone-water mixtures) or of a mixture very rich in solvent (ethylene dichloride-methanol) weakens the structure of the molded article so that it becomes brittle to impact. When more of the non-solvent enters the resin along with the solvent, as in the case of ethylene dichloride and isopropyl ether mixtures, no weakening effect is observed.

The time of the conditioning dip is not critical, 30 seconds or more being satisfactory when used with the above mixtures within the proportions shown. Although somewhat more than 50 and less than 20 parts of ethylene dichloride could be used in the mixture, 20 to 50 represents a convenient working range with sufficient control over the penetration rate. Mixtures of propylene oxide with as much as 50 parts of ethyl ether may be used as the self-lacquering solution. The results are quite similar to those obtained with pure propylene oxide, but the cost of the mixture is less. Although the tests were made at approximately 25° C., the temperature is not critical.

Certain other mixtures of solvents and non-solvents may be employed as the conditioning liquid. Instead of naphtha, any petroleum distillate boiling within the range of about 40° C. to about 200° C. may be used as the non-solvent in admixture with ethylene dichloride. Similarly, acetone may be employed as the solvent component of the conditioning bath, and mixtures containing about 85% of isopropyl ether, or petroleum distillate, and about 15% of acetone are quite suitable. Furthermore, the conditioning bath need not be limited to a mixture of only two components, but may contain several solvents and non-solvents, provided they are so selected and proportioned as to yield a mixture which will penetrate the surface of the material without appreciably dissolving it, with the further condition that the liquid which actually penetrates (or is absorbed by) the material contains substantial quantities (not very much less than approximately 40%) of one or more non-solvents.

The foregoing description is given by way of illustration, and many modifications of the process may be made within the scope of the invention as defined by the appended claims.

I claim:

1. In the process of producing a glossy surface on thermoplastic materials by contacting them with a solvent therefor, the step of preconditioning the materials to prevent embrittlement or surface deterioration, which comprises contacting them with a mixture of solvent and non-solvent therefor, selected and proportioned so that the surface of the material will not appreciably dissolve therein, but will be penetrated by both the solvent and non-solvent, the non-solvent being present in the penetrated surface in an amount equal to at least about 40% by volume of the solvent present therewith in the material.

2. In the process of producing a glossy surface on articles made from vinyl resins by contacting them with a solvent therefor, the step of preconditioning the articles to prevent embrittlement or surface deterioration, which comprises contacting them with a mixture of solvent and non-solvent therefor, selected and proportioned so that the surface of the resin will not appreciably dissolve therein, but will be penetrated by both the solvent and non-solvent, the non-solvent being present in the penetrated surface in an amount equal to at least about 40% by volume of the solvent present therewith in the resin.

3. In the process of producing a glossy surface on articles made of vinyl resins substantially identical with the conjoint polymerization product of a vinyl halide with a vinyl ester of a lower aliphatic acid, by contact with a solvent for the resin, the step of preconditioning the articles to prevent embrittlement or surface deterioration, which comprises contacting them with a mixture of solvent and non-solvent therefor, selected and proportioned so that the surface of the resin will not appreciably dissolve therein, but will be penetrated by both the solvent and non-solvent, the non-solvent being present in the penetrated surface in an amount equal to at least about 40% by volume of the solvent present therewith in the resin.

4. In the process of producing a glossy surface on articles made of vinyl resins substantially identical with the conjoint polymerization product of vinyl chloride with vinyl acetate and containing between about 70% and about 95% vinyl chloride in the polymer, by contact with a solvent for the resin, the step of preconditioning the articles to prevent embrittlement or surface deterioration, which comprises contacting them with a mixture of solvent and non-solvent therefor, selected and proportioned so that the surface of the resin will not appreciably dissolve therein, but will be penetrated by both the solvent and non-solvent, the non-solvent being present in the penetrated surface in an amount equal to at least about 40% by volume of the solvent present therewith in the resin.

5. In the process of producing a glossy surface on articles made of vinyl ester resins, by contact with a solvent for the resin, the step of preconditioning the resin to prevent embrittlement, which comprises contacting the resin with a mixture of a solvent selected from the group consisting of acetone and ethylene dichloride, with a non-solvent selected from the group consisting of isopropyl ether and petroleum distillates boiling within the range of 40° to 200° C., in such proportion that the mixture will penetrate the surface of the resin without appreciably dissolving it.

6. In the process of producing a glossy surface on articles made of vinyl resins substantially identical with the conjoint polymerization product of a vinyl halide with a vinyl ester of a lower aliphatic acid, by contact with a solvent for the resin, the step of preconditioning the resin to prevent embrittlement, which comprises contacting the resin with a mixture of a solvent selected from the group consisting of acetone and ethylene dichloride, with a non-solvent selected from the group consisting of isopropyl ether and petroleum distillates boiling within the range of 40° to 200° C., in such proportion that the mixture will penetrate the surface of the resin without appreciably dissolving it.

7. In the process of producing a glossy surface on articles made of vinyl resins substantially identical with the conjoint polymerization product of vinyl chloride with vinyl acetate, containing between about 70% and about 95% vinyl chloride in the polymer, by contact with a solvent for the resin, the step of preconditioning the resin to prevent embrittlement, which comprises contacting the resin with a mixture of a solvent selected from the group consisting of acetone and ethylene dichloride, with a non-solvent selected from the group consisting of isopropyl ether and petroleum distillates boiling within the range of 40° C. to 200° C., in such proportion that the mixture will penetrate the surface of the resin without appreciably dissolving it.

8. In the process of producing a glossy surface on articles made of vinyl resins substantially identical with the conjoint polymerization product of a vinyl halide with a vinyl ester of a lower aliphatic acid, by contact with a solvent for the resin, the step of preconditioning the resin to prevent embrittlement, which comprises contacting the resin with a mixture of ethylene dichloride and naphtha in such proportions that the mixture will penetrate the surface of the resin without appreciably dissolving it.

9. In the process of producing a glossy surface on articles made of vinyl resins substantially identical with the conjoint polymerization product of a vinyl halide with a vinyl ester of a lower aliphatic acid, by contact with a solvent for the resin, the step of preconditioning the resin to prevent embrittlement, which comprises contacting the resin with the mixture of about 20 parts to about 50 parts of ethylene dichloride and about 80 parts to about 50 parts of naphtha, by volume.

10. In the process of producing a glossy surface on articles made of vinyl resins substantially identical with the conjoint polymerization product of a vinyl halide with a vinyl ester of a lower aliphatic acid, by contact with a solvent for the resin, the step of preconditioning the resin to prevent embrittlement, which comprises contacting the resin with a mixture of ethylene dichloride and isopropyl ether in such proportions that the mixture will penetrate the surface of the resin without appreciably dissolving it.

11. In the process of producing a glossy surface on articles made of vinyl resins substantially identical with the conjoint polymerization product of a vinyl halide with a vinyl ester of a lower aliphatic acid, by contact with a solvent for the resin, the step of preconditioning the resin to prevent embrittlement, which comprises contacting the resin with a mixture of about 20 parts to about 50 parts of ethylene dichloride and about 80 parts to about 50 parts of isopropyl ether, by volume.

12. Method of producing a glossy surface on articles made of vinyl resins having average macromolecular weights between about 10,000 and 15,000, substantially identical with the polymerization product of vinyl chloride with vinyl acetate, and having between about 70% and about 95% vinyl chloride in the polymer, which comprises contacting the articles with a mixture of about 20 parts to about 50 parts of ethylene dichloride and about 80 parts to about 50 parts of naphtha by volume, and thereafter contacting the articles with a volatile solvent for the resin for a sufficient length of time to permit the solvent to dissolve the extreme surfaces of the articles, and removing them therefrom.

13. Method of producing a glossy surface on articles made of vinyl resins having average macromolecular weights between about 10,000 and 15,000, substantially identical with the polymerization product of vinyl chloride with vinyl acetate, and having between about 70% and about 95% vinyl chloride in the polymer, which comprises contacting the articles with a mixture of about 20 parts to about 50 parts of ethylene dichloride and about 80 parts to about 50 parts of naphtha by volume, and thereafter contacting the articles with propylene oxide for a sufficient length of time to permit propylene oxide to dissolve the surfaces of the articles, and removing them therefrom.

CARLETON N. SMITH.